(No Model.)
A. P. POLADURA.
APPARATUS FOR DARKENING TOBACCO.
No. 252,327. Patented Jan. 17, 1882.
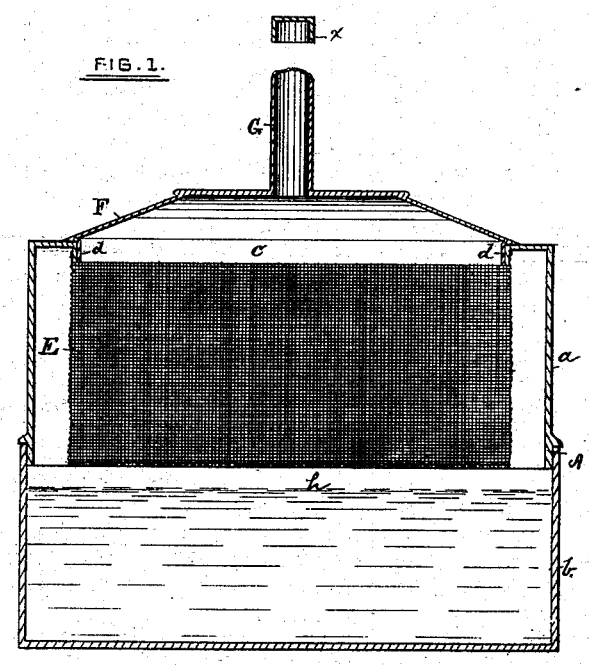
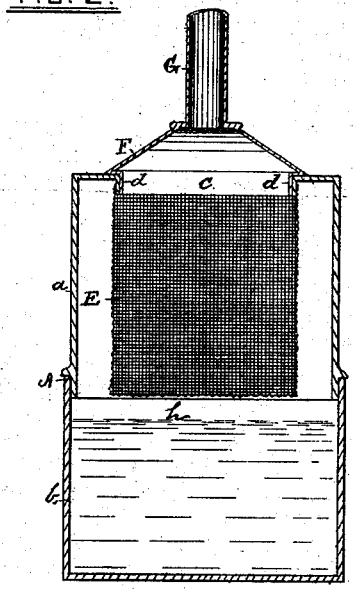
WITNESSES
J. C. Hubbell
P. J. Finney
INVENTOR.
A. P. Poladura
BY H. N. Jenkins
ATTORNEY

UNITED STATES PATENT OFFICE.

ALEXANDER P. POLADURA, OF NEW ORLEANS, LOUISIANA.

APPARATUS FOR DARKENING TOBACCO.

SPECIFICATION forming part of Letters Patent No. 252,327, dated January 17, 1882.

Application filed October 13, 1880. (No model.)

*To all whom it may concern:*

Be it known that I, ALEXANDER PEREZ POLADURA, a resident of the city of New Orleans, parish of Orleans, and State of Louisiana, have invented a certain new and useful Improvement in Apparatus for Darkening Tobacco and Removing Nicotine therefrom; and I do hereby declare the following to be a full, clear, and correct description of the same, reference being had to the annexed drawings, making a part of this specification.

This invention relates to a new apparatus for the removal of nicotine from tobacco, and for giving the leaves a uniform color by darkening the veins thereof.

The nature of my invention will be fully understood by referring to the accompanying drawings, where—

Figure 1 represents a longitudinal sectional view of my apparatus, and Fig. 2 a transverse vertical section of the same.

A is a rectangular vessel, which, to facilitate cleaning, is preferably made in two parts, as shown at $a$ $b$. In the top of this vessel is a rectangular opening, $c$, having an inwardly-projecting flange around the same, as at $d$, from which is suspended in any desired manner a wire basket, E. Over the opening $c$ is fitted a cover, F, in which is constructed a vertical tube, G, for purposes hereinafter described.

It will be observed by reference to the drawings that the wire basket E is attached to the flange $d$ of the upper section, and is removable therewith, and the cover F is provided with a central tube, G, for the escape of the steam.

The lower part of the vessel is partially filled with water, as shown at $h$. The tobacco-leaves to be treated are loosely placed in the wire basket E. The whole apparatus is then placed over a fire, so as to cause the water to boil and the steam arising from same to pass upward through the bottom and sides of the basket, penetrating the tobacco contained therein, and finally passing upward and outward through the tube G when the cap $x$ is removed therefrom. About twenty minutes (more or less) is the time required for subjecting the leaves to this process, which has a tendency to soften the veins thereof and cause the same to absorb sufficient coloring-matter from the balance of the leaves to render the whole of one uniform color. The longer the leaves remain in the steam bath the darker will they become. On removal of the tobacco from the bath the moisture is removed therefrom by pressure, or by exposing the same to the action of the open air or in heated air.

The above-described apparatus not only produces a superior quality of tobacco, but accomplishes the desired result at a much smaller cost than by any other means of which I have any knowledge, inasmuch as the apparatus is of simple and cheap construction, requires but few hands to operate the same, and occupies but little space.

I am aware that it is not broadly new to subject leaves of tobacco to steam for the purpose of coloring the same.

Having described my invention, what I claim as new, and desire to secure by Letters Patent, is—

1. The vessel A, made in two sections, as described, and provided with a wire basket, E, tube G, and cap $x$, as described, and for the purpose set forth.

2. An apparatus for removing nicotine from tobacco-leaves and giving the same a uniform color by darkening the veins thereof, composed of a lower section for containing water, and an upper section with an interior suspended wire basket and a vent-tube, whereby the generated steam in the lower vessel has access to all parts of the suspended wire basket to penetrate the leaves and escape through the vent-tube, substantially as described.

In testimony whereof I have hereunto signed my name.

A. PEREZ POLADURA.

In presence of—
 PAUL SANAGER,
 J. C. HUBBELL.